US007216062B1

(12) United States Patent
Vacar et al.

(10) Patent No.: US 7,216,062 B1
(45) Date of Patent: May 8, 2007

(54) CHARACTERIZING DEGRADATION OF COMPONENTS DURING RELIABILITY-EVALUATION STUDIES

(75) Inventors: Dan Vacar, San Diego, CA (US); David K. McElfresh, San Diego, CA (US); Kenny C. Gross, San Diego, CA (US); Leoncio D. Lopez, Escondido, CA (US)

(73) Assignee: Sun Microsystem, Inc., Santa Clara, CA (US)

( * ) Notice: Subject to any disclaimer, the term of this patent is extended or adjusted under 35 U.S.C. 154(b) by 0 days.

(21) Appl. No.: 11/452,632

(22) Filed: Jun. 13, 2006

(51) Int. Cl.
*G06F 11/30* (2006.01)
(52) U.S. Cl. .................................................. 702/185
(58) Field of Classification Search ................. 702/185
See application file for complete search history.

(56) References Cited

U.S. PATENT DOCUMENTS 5,533,413 A * 7/1996 Kobayashi et al. ........ 73/865.9
5,974,247 A * 10/1999 Yonezawa ..................... 703/19
6,643,801 B1 * 11/2003 Jammu et al. ................ 714/37
2002/0072878 A1 * 6/2002 Kanehira et al. ........... 702/183

* cited by examiner

*Primary Examiner*—John E. Barlow, Jr.
*Assistant Examiner*—Demetrius Pretlow
(74) *Attorney, Agent, or Firm*—Park, Vaughan & Fleming LLP; Gilbert C. Wong

(57) ABSTRACT

A system that characterizes degradation of a component in a system. During operation, the system monitors inferential variables associated with a specimen of the component. Next, the system determines a time for the onset of degradation for the specimen and determines a time for the completion of degradation for the specimen. The system then computes a time interval between the onset of degradation and the completion of degradation, and uses the time interval to look up an entry in a defect library to obtain information which characterizes the degradation of the specimen of the component.

20 Claims, 4 Drawing Sheets

CHARACTERIZING DEGRADATION OF COMPONENTS DURING RELIABILITY-EVALUATION STUDIES

RELATED APPLICATION

This application is related to pending U.S. patent application, entitled "Detecting Degradation of Components During Reliability-Evaluation Studies," by inventors Dan Vacar, Kenny C. Gross, David K. McElfresh, and Leoncio D. Lopez, having Ser. No. 11/219,091 and a filing date of 1 Sep. 2005. This application is hereby incorporated by reference.

BACKGROUND

1. Field of the Invention

The present invention relates to techniques for determining the reliability of a component in a system. More specifically, the present invention relates to a method and apparatus for characterizing degradation of a component during a reliability-evaluation study.

2. Related Art

An increasing number of businesses are using computer systems for mission-critical applications. In such applications, a component failure can have a devastating effect on the business. For example, the airline industry is critically dependent on computer systems that manage flight reservations, and would essentially cease to function if these systems failed. Hence, it is critically important to measure component reliabilities to ensure that they meet or exceed the reliability requirements of the computer system.

Unfortunately, determining the reliability of a component can be very time consuming if reliability testing is performed under normal operating conditions. This is because, under normal conditions, a highly reliable component can take an inordinate amount of time to fail.

Consequently, component reliabilities are often determined using "reliability-evaluation studies." These reliability-evaluation studies can include "accelerated-life studies," which accelerate the failure mechanisms of a component, or "burn-in studies," which determine if a particular component is functioning properly prior to being shipped to customers. These types of studies subject the component to stressful conditions, typically using environmental stress-test chambers to hold and/or cycle one or more stress variables (e.g., temperature, humidity, radiation flux, etc.) at levels that are believed to accelerate subtle failure mechanisms within the component. Note that, even under stress conditions, components typically need to be tested for time periods that may range from hours to months. Furthermore, it is usually not possible to test the components or systems while they are in the stress-test chambers. Consequently, to test the systems or components under stress, they are typically removed from the stress-test chambers and tested externally to count the number of components that have failed. The systems that have not failed are then returned to the stress-test chambers and are tested further. In this manner, a reliability-evaluation study generates a history of failed and not-failed system/component counts at discrete time intervals.

Unfortunately, reliability-evaluation studies are typically expensive and time consuming. More specifically, these studies typically involve making a tradeoff between the number of units under test, and the time they are subjected to the stress test. If the components are expensive and/or in very short supply (e.g. pre-manufacturing prototype components, or high-end computer systems), long test windows are needed to get a statistically significant number of failures to draw meaningful reliability conclusions. On the other hand, if the components are cheap and readily obtainable, such that a large population of components can be placed under stress, the ex-situ functional testing becomes resource-intensive because the stress-test needs to be halted frequently to evaluate how many units have failed.

Furthermore, the history of failed and not-failed system/component counts obtained by ex-situ functional testing does not provide accurate data to classify the degradation mechanisms for the components.

Hence, what is needed is a method and an apparatus for characterizing degradation of a component during a reliability-evaluation study without the problems described above.

SUMMARY

One embodiment of the present invention provides a system that characterizes degradation of a component in a system. During operation, the system monitors inferential variables associated with a specimen of the component. Next, the system determines a time for the onset of degradation for the specimen and determines a time for the completion of degradation for the specimen. The system then computes a time interval between the onset of degradation and the completion of degradation, and uses the time interval to look up an entry in a defect library to obtain information which characterizes the degradation of the specimen of the component.

In a variation on this embodiment, the system determines the sign of the degradation. The system then uses the time interval and the sign of the degradation to look up an entry in the defect library to obtain information which characterizes the degradation of the specimen of the component.

In a variation on this embodiment, while monitoring the inferential variables, the system applies a Sequential Probability Ratio Test (SPRT) to time series of the inferential variables to detect changes in the inferential variables.

In a further variation, the inferential variables can include a physical parameter for the component and a first derivative of the physical parameter for the component.

In a further variation, while determining the time for the onset of degradation, the system detects a change in the physical parameter for the component. The system then determines whether the change indicates that the specimen of the component is at the onset of degradation. If so, the system notes the time when the specimen of the component was determined to be at the onset of degradation.

In a further variation, while determining the time for the completion of degradation, the system detects a change in the first derivative of the physical parameter. The system then determines whether the change in the first derivative indicates that degradation of the component has completed. If so, the system notes the time when the degradation of the component completed.

In a variation on this embodiment, prior to monitoring the inferential variables, the system applies test conditions to the specimen of the component.

In a further variation, the system determines if the test conditions need to be modified. If so, the system alters the test conditions and continues to monitor the inferential variables associated with specimens of the component.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, flash memory, magnetic tape, CDs (compact discs) and DVDs (digital versatile discs or digital video discs).

Accelerated-Life Studies

For devices undergoing accelerated-life studies, it is often desirable to supply power to the devices under test while they are in the stress-test chambers. Even though it may not be possible to apply the full pass/fail functional testing to the devices inside the stress-test chamber, a change in the electrical behavior of the device can be detected by monitoring the signatures of the electrical current being applied to the devices. Note that subtle anomalies in the noise-signature time-series of the current for the device appear when the device degrades and/or fails. Also note that the current to the device can provide an indirect measure of the health of a device. More specifically, the current-noise time series can be used as an "inferential variable" for high-resolution annunciation of the onset of degradation and, in many cases, the exact point of failure in time in the components undergoing accelerated-life studies.

Figure 1:
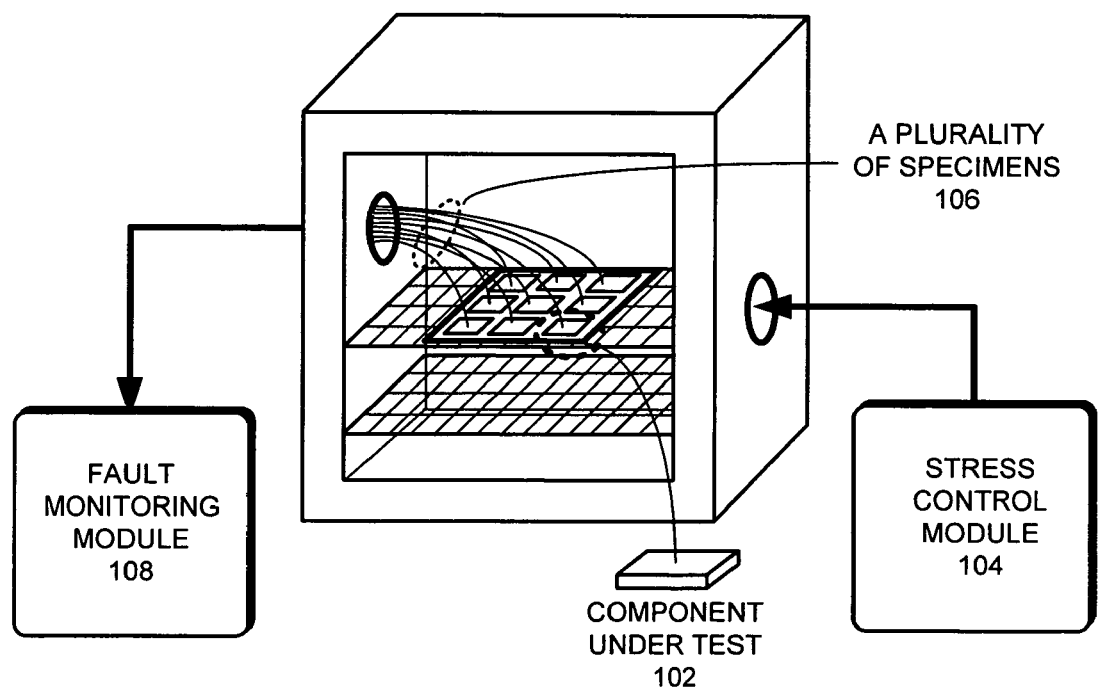
FIG. 1 illustrates an in-situ reliability stress-test chamber in accordance with an embodiment of the present invention.

FIG. 1 illustrates an in-situ reliability stress-test chamber 100 in accordance with an embodiment of the present invention. A component under test 102, which can be any type of device from a computer system, is placed inside stress-test chamber 100. Note that component under test 102 can include, but is not limited to: power supplies, capacitors, sockets, integrated circuit chips, hard drives, and transceivers.

Stress control module 104 applies and controls one or more stress variables to the stress-test chamber 100. These stress variables can include, but are not limited to: temperature, humidity, vibration, voltage, chemical/environmental, and radiation. In one embodiment of the present invention, stress control module 104 applies sufficient stress factors to stress-test chamber 100 to create accelerated-life studies for the component under test 102. The same setup can also be applied to early failure rate studies of a component, burn-in screens of a component and repair-center reliability evaluations of a returned component.

As is shown in FIG. 1, stress-test chamber 100 can contain multiple units (specimens) of component under test 102, wherein an array of nine specimens 106 of component under test 102 are shown. Stress-test chamber 100 provides a supply of power to each specimen of component under test 102, and obtains telemetry signal outputs (e.g., inferential variables) from each specimen. The telemetry signal outputs are coupled to a fault-monitoring module 108. In one embodiment of the present invention, fault-monitoring module 108 is a Continuous System Telemetry Harness (CSTH).

Note that the output data series can be either processed in real-time or post-processed. In one embodiment of the present invention, fault-monitoring module 108 analyzes the output data series in real-time while the telemetry signals are being collected from all of the specimens 106 of component under test 102, and predicts the likelihood of failure for each of specimens 106. In another embodiment of the present invention, fault-monitoring module 108 post-processes the output data series at a later time and detects whether failures have occurred at an earlier time, and if so, determines the time of failures. Note that the output data series can include but is not limited to: a time-series, a number of cycles, and a number of incidents.

Furthermore, note that the telemetry signal from each specimen of the component can include current, voltage, resistance, temperature, and other physical variables. Also, note that all of the specimens 106 in stress-test chamber 100 can be tested at the same time and under the same conditions. Moreover, instead of testing multiple individual components, the stress-test chamber can be configured to test a single component.

One embodiment of the present invention uses an ultra-sensitive sequential detection technique called the Sequential Probability Ratio Test (SPRT) for inferential variable surveillance to accurately identify the onset of component degradation and/or failure. Moreover, a tandem SPRT can be run on the derivative of the inferential variable's time series to accurately assess the time of complete of failure. The combination of tandem SPRTs that monitor the inferential variables provides a robust surveillance scheme which has the capability to:

1. detect the onset of degradation in any individual component under stress, even when the overall functionality of that component cannot be measured directly; and to
2. detect the time of complete failure for any component under stress.

In one embodiment of the present invention, information from the tandem SPRT analyses is combined with discrete-time ex-situ pass/fail testing to construct a detailed population failure distribution.

One embodiment of the present invention lessens the constraints on the tradeoff between the number of units under test and the duration of the experiments, while yielding much higher resolution information on the dynamic evolution of the health of the components as a function of age and cumulative stress. This higher resolution facilitates higher confidence in selecting a mathematical model that accurately predicts the long-term reliability of the component for a time point beyond the number of hours the component was actually tested.

Also note that the present invention minimizes expensive ex-situ functional evaluations.

SPRT (Sequential Probability Ratio Test)

The Sequential Probability Ratio Test is a statistical hypothesis test that differs from standard fixed sample tests. In fixed-sample statistical tests, a given number of observations are used to select one hypothesis from one or more alternative hypotheses. The SPRT, however, examines one observation at a time, and then makes a decision as soon as it has sufficient information to ensure that pre-specified confidence bounds are met.

The basic approach taken by the SPRT technique is to analyze successive observations of a discrete process. Let $y_n$ represent a sample from the process at a given moment $t_n$ in time. In one embodiment of the present invention, the sequence of values $\{Y_n\}=y_0, y_1, \ldots, y_n$ comes from a stationary process characterized by a Gaussian, white-noise probability density function (PDF) with mean 0. (Note that since with the sequence is from a nominally stationary processes, any process variables with a nonzero mean can be first normalized to a mean of zero with no loss of generality).

The SPRT is a binary hypothesis test that analyzes process observations sequentially to determine whether or not the signal is consistent with normal behavior. When a SPRT reaches a decision about current process behavior (i.e. the signal is behaving normally or abnormally), the system reports the decision and continues to process observations.

For each of the six types of tandem SPRT tests described below, the signal data adheres to a Gaussian PDF with mean 0 and variance $\sigma^2$ for normal signal behavior, referred to as the null hypothesis, $H_0$. The system computes six specific SPRT hypothesis tests in parallel for each inferential variable monitored. One embodiment of the present invention applies a SPRT to an electrical current time-series. Other embodiments of the present invention apply a SPRT to other inferential variables, including voltage, internal temperature, or stress variables.

The SPRT surveillance module executes all 6 tandem hypothesis tests in parallel. Each test determines whether the current sequence of process observations is consistent with the null hypothesis versus an alternative hypothesis. The first four tests are: (SPRT 1) the positive-mean test, (SPRT 2) the negative-mean test, (SPRT 3) the nominal-variance test, and (SPRT 4) the inverse-variance test. For the positive-mean test, the signal data for the corresponding alternative hypothesis, $H_1$, adheres to a Gaussian PDF with mean +M and variance $\sigma^2$. For the negative-mean test, the signal data for the corresponding alternative hypothesis, $H_2$, adheres to a Gaussian PDF with mean −M and variance $\sigma^2$. For the nominal-variance test, the signal data for the corresponding alternative hypothesis, $H_3$, adheres to a Gaussian PDF with mean 0 and variance $V\sigma^2$ (with scalar factor V). For the inverse-variance test, the signal data for the corresponding alternative hypothesis, $H_4$, adheres to a Gaussian PDF with mean 0 and variance $\sigma^2/V$.

Two additional tandem SPRT tests are performed not on the raw inferential variables as above, but on the first difference function of the inferential variable. For discrete time series, the first difference function (i.e. difference between each observation and the observation preceding it) gives an estimate of the numerical derivative of the time series. During uninteresting time periods, the observations in the first difference function are a nominally stationary random process centered about zero. If an upward or downward trend suddenly appears in the signal, SPRTs number 5 and 6 observe an increase or decrease, respectively, in the slope of the inferential variable.

For example, if there is a decrease in the value of the inferential variable, SPRT alarms are triggered for SPRTs 2 and 6. SPRT 2 generates a warning because the sequence of raw observations drops with time. And SPRT 6 generates a warning because the slope of the inferential variable changes from zero to something less than zero. The advantage of monitoring the mean SPRT and slope SPRT in tandem is that the system correlates the SPRT readings from the six tests and determines if the component has failed. For example, if the signal levels off to a new stationary value (or plateau), the alarms from SPRT 6 cease because the slope returns to zero when the raw signal reaches a plateau. However, SPRT 2 will continue generating a warning because the new mean value of the signal is different from the value prior to the degradation. Therefore, the system correctly identifies that the component has failed.

If SPRTs 3 or 4 generates a warning, the variance of the inferential variable is either increasing or decreasing, respectively. An increasing variance that is not accompanied by a change in mean (inferred from SPRTs 1 and 2 and SPRTs 5 and 6) signifies an episodic event that is "bursty" or "spiky" with time. A decreasing variance that is not accompanied by a change in mean is a common symptom of a failing component that is characterized by an increasing time constant. Therefore, having variance SPRTs available in parallel with slope and mean SPRTs provides a wealth of supplementary diagnostic information that has not been possible with conventional accelerated-life studies.

The final two tandem SPRT tests, SPRT 7 and SPRT 8, are performed on the first difference function of the variance estimates for the inferential variable. The first difference function of the variance estimates is a numerical approximation of the derivative of the sequence of variance estimates. As such, SPRT 7 triggers a warning flag if the variance of the inferential variable is increasing, while SPRT 8 triggers a warning flag if the variance of the inferential variable is decreasing. A comparison of SPRT alarms from SPRTs 3, 4, 7, and 8, gives a great deal of diagnostic information on a class of failure modes known collectively as a "change in gain without a change in mean." For example, if SPRTs 3 and 7 both trigger warning flags, it is an indication that there has been a sudden increase in the variance of the process. If SPRT 3 continues to trigger warning flags but SPRT 7 ceases issuing warning flags, it is an indication that the degradation mode responsible for the increased noisiness has gone to completion. Such information can be beneficial in root causing the origin of the degradation and eliminating it from future product designs.

Similarly, if SPRTs 4 and 8 both start triggering alarms, there is a decrease in variance for the process. If SPRT 4 continues to issue warning flags but SPRT 8 ceases issuing warning flags, it is an indication that the degradation mode has gone to completion. In safety-critical processes, this failure mode (decreasing variance without a change in mean) is dangerous in conventional systems that are monitored only by threshold limit tests. The reason it is dangerous is that a shrinking variance, when it occurs as a result of a transducer that is losing its ability to respond, never trips a threshold limit. (In contrast degradation that manifests as a linear decalibration bias, or even an increasing variance, eventually trips a high or low threshold limit and sounds a warning). A sustained decreasing variance, which happens, for example, when oil-filled pressure transmitters leak their oil, or electrolytic capacitors leak their electrolyte, never trips a threshold in conventional systems, but will be readily detected by the suite of 8 tandem SPRT tests taught in this invention.

The SPRT technique provides a quantitative framework that permits a decision to be made between the null hypothesis and the six alternative hypotheses with specified misidentification probabilities. If the SPRT accepts one of the alternative hypotheses, an alarm flag is set and data is transmitted.

The SPRT operates as follows. At each time step in a calculation, the system calculates a test index and compares it to two stopping boundaries A and B (defined below). The test index is equal to the natural log of a likelihood ratio ($L_n$), which for a given SPRT is the ratio of the probability that the alternative hypothesis for the test ($H_j$, where j is the appropriate subscript for the SPRT in question) is true, to the probability that the null hypothesis ($H_0$) is true.

$$L_n = \frac{\text{probability of observed sequence } \{Y_n\} \text{ given } H_j \text{ is true}}{\text{probability of observed sequence } \{Y_n\} \text{ given } H_0 \text{ is true}} \quad (1)$$

If the logarithm of the likelihood ratio is greater than or equal to the logarithm of the upper threshold limit [i.e., $\ln(L_n) > \ln(B)$], then the alternative hypothesis is true. If the logarithm of the likelihood ratio is less than or equal to the logarithm of the lower threshold limit [i.e., $\ln(L_n) < \ln(A)$], then the null hypothesis is true. If the log likelihood ratio falls between the two limits, [i.e., $\ln(A) < \ln(L_n) < \ln(B)$], then there is not enough information to make a decision (and, incidentally, no other statistical test could yet reach a decision with the same given Type I and II misidentification probabilities).

Equation (2) relates the threshold limits to the misidentification probabilities $\alpha$ and $\beta$:

$$A = \frac{\beta}{1-\alpha}, \quad B = \frac{1-\beta}{\alpha} \quad (2)$$

where $\alpha$ is the probability of accepting $H_j$ when $H_0$ is true (i.e., the false-alarm probability), and $\beta$ is the probability of accepting $H_0$ when $H_j$ is true (i.e., the missed-alarm probability).

The first two SPRT tests for normal distributions examine the mean of the process observations. If the distribution of observations exhibits a non-zero mean (e.g., a mean of either +M or –M, where M is the pre-assigned system disturbance magnitude for the mean test), the mean tests determine that the system is degraded. Assuming that the sequence $\{Y_n\}$ adheres to a Gaussian PDF, then the probability that the null hypothesis $H_0$ is true (i.e., mean 0 and variance $\sigma^2$) is:

$$P(y_1, y_2, \ldots, y_n \mid H_0) = \frac{1}{(2\pi\sigma^2)^{n/2}} \exp\left[-\frac{1}{2\sigma^2}\sum_{k=1}^{n} y_k^2\right] \quad (3)$$

Similarly, the probability for alternative hypothesis $H_1$ is true (i.e. mean M and variance $\sigma^2$) is:

$$P(y_1, y_2, \ldots, y_n \mid H_1) = \quad (4)$$

$$\frac{1}{(2\pi\sigma^2)^{n/2}} \exp\left[-\frac{1}{2\sigma^2}\left(\sum_{k=1}^{n} y_k^2 - 2\sum_{k=1}^{n} y_k M + \sum_{k=1}^{n} M^2\right)\right]$$

The ratio of the probabilities in (3) and (4) gives the likelihood ratio $L_n$ for the positive-mean test:

$$L_n = \exp\left[-\frac{1}{2\sigma^2}\sum_{k=1}^{n} M(M - 2y_k)\right] \quad (5)$$

Taking the logarithm of likelihood ratio given by (5) produces the SPRT index for the positive-mean test ($SPRT_{pos}$):

$$SPRT_{pos} = -\frac{1}{2\sigma^2}\sum_{k=1}^{n} M(M - 2y_k) = \frac{M}{\sigma^2}\sum_{k=1}^{n}\left(y_k - \frac{M}{2}\right) \quad (6)$$

The SPRT index for the negative-mean test ($SPRT_{neg}$) is derived by substituting –M for each instance of M in (4) through (6) above, resulting in:

$$SPRT_{neg} = \frac{M}{\sigma^2}\sum_{k=1}^{n}\left(-y_k - \frac{M}{2}\right) \quad (7)$$

The remaining two SPRT tests examine the variance of the sequence. This capability gives the SPRT module the ability to detect and quantitatively characterize changes in variability for processes, which is vitally important for 6-sigma QA/QC improvement initiatives. In the variance tests, the system is degraded if the sequence exhibits a change in variance by a factor of V or 1/V, where V, the pre-assigned system disturbance magnitude for the variance test, is a positive scalar. The probability that the alternative hypothesis $H_3$ is true (i.e., mean 0 and variance $V\sigma^2$) is given by (3) with $\sigma^2$ replaced by $V\sigma^2$:

$$P(y_1, y_2, \ldots, y_n \mid H_0) = \frac{1}{(2\pi\sigma^2)^{n/2}} \exp\left[-\frac{1}{2V\sigma^2}\sum_{k=1}^{n} y_k^2\right] \quad (8)$$

The likelihood ratio for the variance test is given by the ratio of (8) to (3):

$$L_n = V^{-n/2} \exp\left[-\frac{1}{2\sigma^2}\frac{1-V}{V}\sum_{k=1}^{n} y_k^2\right] \quad (9)$$

Taking the logarithm of the likelihood ratio given in (9) produces the SPRT index for the nominal-variance test ($SPRT_{nom}$):

$$SPRT_{nom} = \frac{1}{2\sigma^2}\left(\frac{V-1}{V}\right)\sum_{k=1}^{n} y_k^2 - \frac{n}{2}\ln V \quad (10)$$

The SPRT index for the inverse-variance test ($SPRT_{inv}$) is derived by substituting 1/V for each instance of V in (8) through (10), resulting in:

$$SPRT_{inv} = \frac{1}{2\sigma^2}(1-V)\sum_{k=1}^{n} y_k^2 + \frac{n}{2}\ln V \quad (11)$$

The tandem SPRT module performs mean, variance, and SPRT tests on the raw process signal and on its first difference function. To initialize the module for analysis of a stress-test inferential variable time-series, the user specifies the system disturbance magnitudes for the tests (M and V), the false-alarm probability ($\alpha$), and the missed-alarm probability ($\beta$).

Then, during the training phase (before the first failure of a component under test), the module calculates the mean and variance of the monitored variable process signal. For most inferential variables the mean of the raw observations for the inferential variable will be nonzero; in this case the mean calculated from the training phase is used to normalize the signal during the monitoring phase. The system disturbance magnitude for the mean tests specifies the number of standard deviations (or fractions thereof) that the distribution must shift in the positive or negative direction to trigger an alarm. The system disturbance magnitude for the variance tests specifies the fractional change of the variance necessary to trigger an alarm.

At the beginning of the monitoring phase, the system sets all six SPRT indices to 0. Then, during each time step of the calculation, the system updates the SPRT indices using (6), (7), (10), and (11). The system compares each SPRT index is then compared to the upper [i.e., $\ln((1-\beta)/\alpha]$ and lower [i.e., $\ln(\beta/(1-\alpha))$] decision boundaries, with these three possible outcomes:
1. the lower limit is reached, in which case the process is declared healthy, the test statistic is reset to zero, and sampling continues;
2. the upper limit is reached, in which case the process is declared degraded, an alarm flag is raised indicating a sensor or process fault, the test statistic is reset to zero, and sampling continues; or
3. neither limit has been reached, in which case no decision concerning the process can yet be made, and the sampling continues.

The advantages of using a SPRT are twofold:
1. early detection of very subtle anomalies in noisy process variables; and
2. pre-specification of quantitative false-alarm and missed-alarm probabilities.

The present invention uses tandem SPRTs to monitor "derivative SPRTs" in parallel with mean and variance SPRTs that are performed on the time-series associated an inferential variable in the context of accelerated-life studies, where it is not possible to perform direct functional tests in real-time. The new tandem-SPRT approach facilitates determining the onset of hardware degradation for components under test as well as the exact time of failure (within the resolution of the time samples for the inferential variable). Moreover, the onset of "spiky" degradation in components as well as degradation in the sensor that is used to measure the inferential variable can be deduced. Information from the suite of six tandem SPRTs provides a substantially complete and substantially accurate picture of the dynamic reliability of the components under test as a function of age and cumulative stress.

Detecting the Onset of Hardware Degradation

Figure 2:
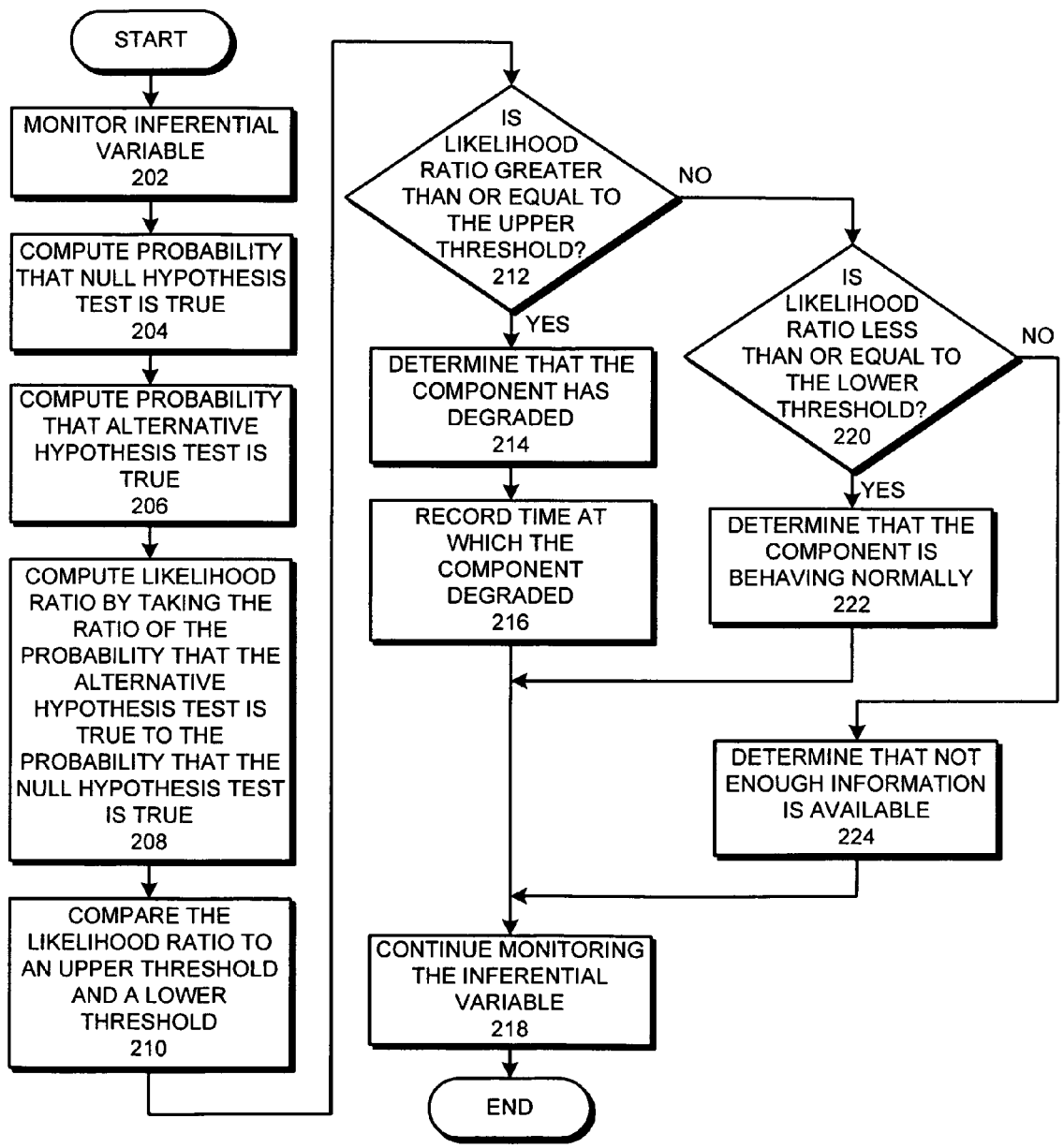
FIG. 2 presents a flow chart illustrating the process of detecting the onset of hardware degradation for components undergoing accelerated-life studies in accordance with an embodiment of the present invention.

FIG. 2 presents a flow chart illustrating the process of detecting the onset of hardware degradation for components undergoing accelerated-life studies in accordance with an embodiment of the present invention.

During operation, the system monitors an inferential variable (step 202).

Next, the system computes a probability that the null hypothesis test is true (step 204) and computes the probability that an alternative hypothesis test is true (step 206). Recall that the null hypothesis is true if the specimen of the component is behaving normally and has not degraded. Conversely, the alternative hypothesis is true if the specimen of the component has degraded.

The system then computes a likelihood ratio by taking the ratio of the probability that the alternative hypothesis test is true to the probability that the null hypothesis tests is true (step 208).

Next, the system compares the likelihood ratio to an upper threshold and a lower threshold (step 210). Note that these thresholds allow the user to tune the sensitivity of the process while detecting abnormal behavior of an inferential variable.

If the likelihood ratio is greater than or equal to the upper threshold (step 212), the system determines that the component has degraded (step 214) and records the time at which the component has degraded (step 216). The system then continues monitoring the inferential variable (step 218).

On the other hand, if the likelihood ratio is less than or equal to the lower threshold (step 220), the system determines that the inferential variable is observing background variations (step 222) and continues monitoring the inferential variable (step 218).

Finally, if the likelihood ratio is between the lower and the upper thresholds, the system determines that not enough information is available (step 224) and continues monitoring the inferential variable (step 218).

Monitoring Dynamic Behaviors Using Multiple Specimens

Figure 3:
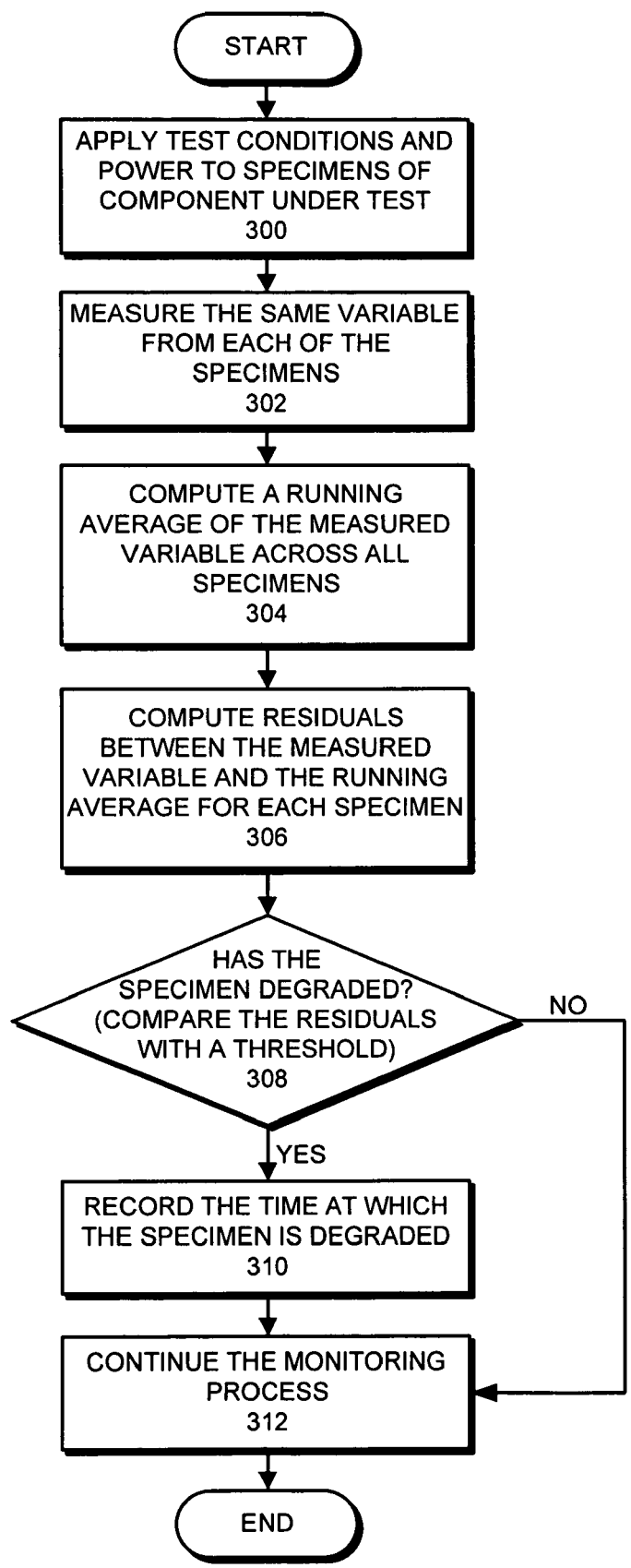
FIG. 3 presents a flowchart illustrating the process of monitoring the dynamic behavior of telemetry signals during an accelerated-life study of a component in accordance with an embodiment of the present invention.

FIG. 3 presents a flowchart illustrating the process of monitoring the dynamic behavior of telemetry signals during an accelerated-life study of a component in accordance with an embodiment of the present invention. Prior to the accelerated-life study, a plurality of specimens of the test component are placed inside a stress-test chamber. During operation, test conditions are applied to the plurality of specimens while they are supplied with power (step 300). Note that the test conditions comprise a set of stress parameters which can affect the health of the component. For example, these parameters can include but are not limited to: temperature, humidity, vibration, voltage, power surge, and radiation.

Next, while applying the test conditions and supplying the power, the system measures the same variable (or variables) from each of the plurality of specimens (step 302). This variable can be, for example, current, voltage, resistance, temperature, and other physical or non-physical variables whose time-dependent behaviors can be used to infer the health of the specimens. The measured variable data series are then communicates to fault-monitoring module 108 for processing.

Next, the system computes a running average of the measured variable across the plurality of specimens (step 304). Note that the computed running average contains the common-mode behavior in the measured variable across the plurality of specimens, while the dynamic behavior in the measured variable associated with a specific specimen is suppressed. Also note that it is desirable to monitor a sufficient number of specimens to generate a running average that achieves above-described properties of the running average.

The system then computes residuals between the measured variable for each specimen and the computed running average (step 306). In so doing, the common-mode behavior among the plurality of specimens is removed from the measured variable for each specimen. Consequently, the residuals contain primarily the dynamic behaviors in the measured variable for each specimen. Note that the residuals are corresponding to the same time intervals used to compute the current running average.

Next, the system determines from the residuals whether the associated specimens have degraded (step 308). Note that anomalous behaviors in the measured variables often manifest themselves in dynamic behaviors such as spikes in the signals. These spikes remain in the residuals and can be detected simply by setting a threshold limit to the residuals. In one embodiment of the present invention, determining whether the specimens have degraded involves comparing the residuals of the specimens with a set of threshold limits. If the residuals are found to be greater than the threshold limits at a specific point of time, then an anomaly in the measured variable is inferred. Note that by placing the threshold limits on the residuals associated with each specimen, it becomes possible to catch subtle degradation in a specimen, even when the magnitude of the degradation (e.g. the magnitude of a spike) is smaller than the common-mode variation in the specimen's measured variable.

If degradations in the residuals are found in one or more specimens, the system records the exact times at which the specimens of the component were determined to have degraded based on the time stamps for the anomalies in the time series (step 310). Additionally, for certain accelerated-life studies, the system also determines how many test events have been repeated on a specimen when the specimen was determined to have degraded. For example, a switching device is often tested for its maximum number of lifetime switching operations before a functional degradation. In another example, a component can be frequently tested under a cyclic condition, such as ramping the testing temperature up and down in controlled cycles. Note that both the time of degradation/failure and the number of cycles performed on the specimen towards its degradation/failure are extremely useful in revealing the underlying physics associated with the mode or modes of degradation/failure, which can lead to better understanding of degradation/failure mechanisms.

Next, the system continues the above-described monitoring and detecting process until the accelerated-life study is complete (step 312).

Note that the above-described accelerated-life test is an in-situ test, wherein the quality and reliability of the component are determined based on the dynamic behavior in the measured variable of the component when the component operates under stress conditions. Also note that steps 304, 306, 308 and 310 can be performed either in real-time or during a post-processing operation.

Characterizing Degradation of Components

One embodiment of the present invention detects the time when a component is at the onset of degradation and detects the time when a component has completely degraded. In this embodiment, a degradation time interval (i.e., the time interval between the onset of degradation and the completion of degradation) is compared to a defect library to obtain information which characterizes the degradation of the component.

One embodiment of the present invention detects repeated failures of components. For examples, the present invention can detect sockets that fail, recover and fail again.

In one embodiment of the present invention, the time signature of degradation is analyzed to determine the failure mode and root cause of the degradation. In another embodiment of the present invention, the detailed degradation data is used to determine the underlying physics associated with the mode or modes of degradation. This leads to better insight and understanding of failure mechanisms thereby leading to improved future designs. Note that the simple failed/survived counts obtained from conventional accelerated-life studies cannot be used to extract this information.

One embodiment of the present invention provides high-resolution information on the dynamic evolution of the health and the degradation processes for the components under accelerated-life studies as a function of cumulative stress.

One embodiment of the present invention uses the current-noise time series for a component to infer the health of the component and/or the dynamics of the degradation process. The current-noise time series is an "inferential variable," which can be used to detect the onset of degradation and can be used to detect the exact time of failure of components undergoing reliability-evaluation studies. In one embodiment of the present invention, the inferential-variable time series reveals the dynamics underlying the degradation mechanism. The information extracted by the present invention allows for in-situ or post-process characterization and classification of failure modes.

Note that although the present invention is described (above and below) in the context of a current time series, it can generally be applied to any inferential variable including, but not limited to: temperature, optical power and/or wavelength, sound, vibrations, and air velocity.

One embodiment of the present invention uses tandem SPRTs run on the inferential-variable time series and on the first derivative of the inferential-variable time series, to accurately identify the time when a component was determined to be at the onset of degradation and the time when the component was determined to have completely degraded. Note that the first derivative of the inferential-variable time series can be obtained by a moving-window numerical derivative function. This pair of SPRTs provides a robust surveillance scheme that has the capability to in-situ:

(1) detect the time of degradation onset (TDO) in any individual component under stress, even when the overall functionality of that component cannot be measured directly;

(2) detect the direction of degradation as the sign (or polarity) of the change in the inferential variable being surveilled;

(3) detect the time of degradation completion (TDC)—or time of complete failure—for components under stress;

(4) estimate the degradation time interval (DTI) as the difference between TDC and TDO;

(5) rapidly characterize and classify defect failure modes based on the length of the DTI and the sign of the change in the inferential variable;

(6) identify and characterize the modes and severity for specific physical mechanisms responsible for the failure of the respective components undergoing reliability stress testing (if the inferential-variable time series and the first derivative of the inferential-variable time series are sampled at an appropriately high rate); and to (7) alter the test in various manners. For example to: (i) stop the test if over stress is indicated, (ii) increase monitoring, (iii) add additional (indirect) variables to monitor to help understand what is going on, and to (iv) modify physical testing conditions.

In one embodiment of the present invention, the accelerated-life study test conditions are modified based on real-time degradation data collected by the system. For example, the following test conditions can be changed based on the real-time degradation data: the temperature, the voltage, the pressure, the humidity, the number of inferential variables monitored, and the sampling rate used to monitor the inferential variables. Furthermore, if the degradation data indicates that over stress exists (i.e., components dying slowing instead of rapidly implies that the components are wearing out and not failing randomly), the reliability-evaluation study can be stopped and testing conditions can be adjusted to exercise other failure modes.

Figure 4:
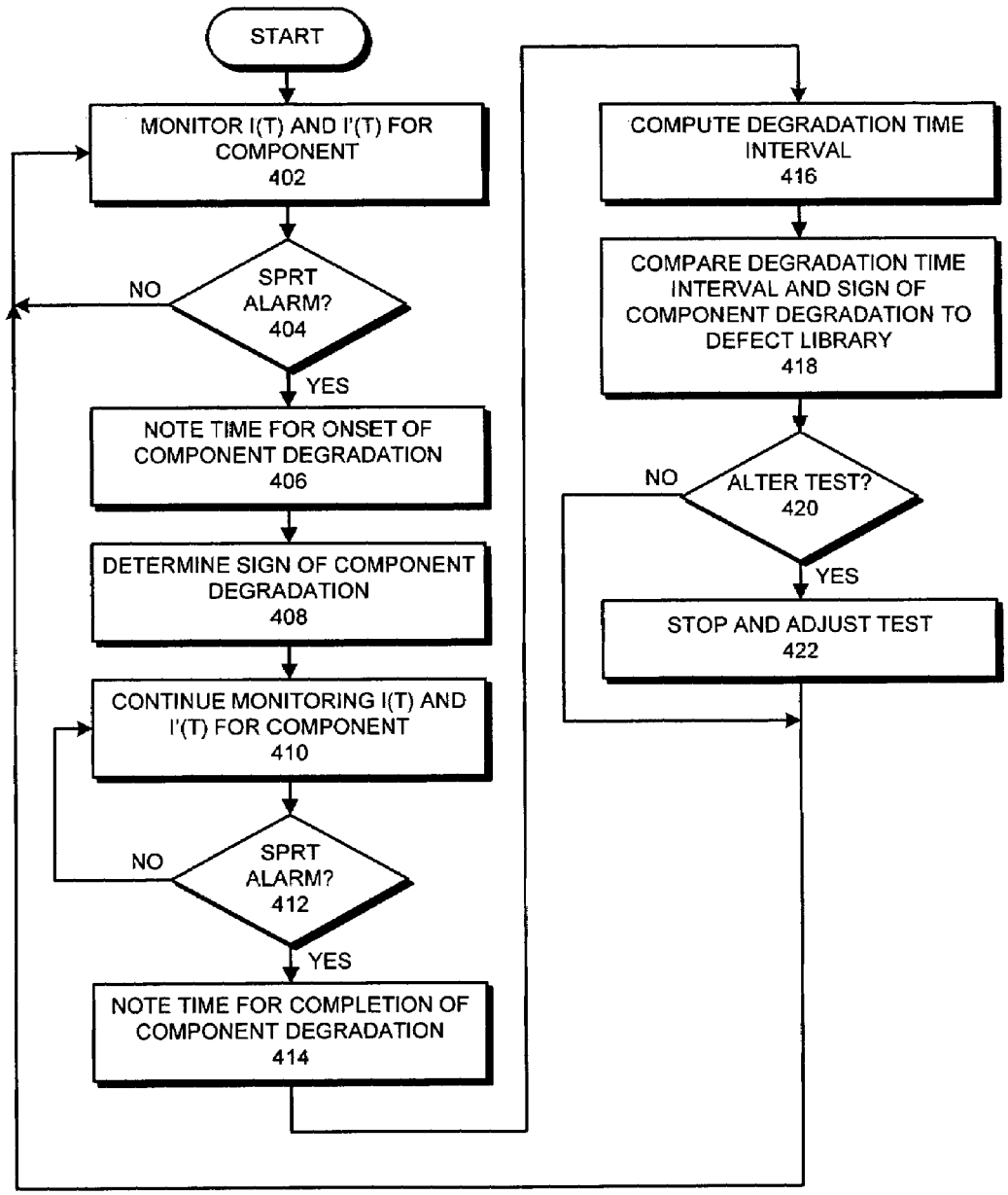
FIG. 4 presents a flow chart illustrating the process of characterizing degradation of components undergoing accelerated-life studies in accordance with an embodiment of the present invention.

FIG. 4 presents a flow chart illustrating the process of characterizing degradation of components undergoing accelerated-life studies in accordance with an embodiment of the present invention. The process begins when the system monitors the time series and the first derivative of the time series for the current consumed by a component (step 402). The system then determines whether a SPRT alarm was triggered on the time series and the first derivative of the time series for the current consumed by the component (step 404). Note that a SPRT alarm on the time series and the first derivative of the time series for the current consumed by the component indicates that the component is at the onset of degradation. If a SPRT alarm was not triggered, the system continues monitoring the time series and the first derivative of the time series for the current consumed by a component (step 402). Otherwise, the system notes the time when the component was determined to be at the onset of degradation (step 406). The system then determines the sign of the degradation (step 408).

The system continues monitoring the time series and the first derivative of the time series for the current consumed by a component (step 410). The system then determines if a SPRT alarm was triggered on the first derivative of the time series for the current consumed by the component (step 412). Note that a SPRT alarm on the first derivative of the time series for the current consumed by the component indicates that the component has completed degradation. If a SPRT alarm was not triggered, the system continues monitoring the time series and the first derivative of the time series for the current consumed by a component (step 410). Otherwise, the system notes the time when the component was determined to have degraded (step 414).

Next, the system computes the degradation time interval between the onset of degradation and the completion of degradation for the component (step 416). The system then compares the degradation time interval and the sign of the degradation to a defect library to classify the mode of failure (step 418).

Next, the system determines if the test conditions need to be altered (step 420). If so, the system stops the reliability-evaluation stress test and adjusts the test conditions (step 222). After adjusting the test conditions or if the test conditions do not need to be altered, the system returns to step 402 and continues monitoring the time series and the first derivative of the time series for the current consumed by the components.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for characterizing degradation of a component in a system, comprising:
   monitoring inferential variables associated with a specimen of the component;
   determining a time for an onset of degradation for the specimen;
   determining a time for a completion of degradation for the specimen;
   computing a time interval between the onset of degradation and the completion of degradation for the specimen; and
   using the time interval to look up an entry in a defect library to obtain information which characterizes the degradation of the specimen of the component.

2. The method of claim 1, further comprising:
   determining the sign of the degradation; and
   using the time interval and the sign of the degradation to look up an entry in the defect library to obtain information which characterizes the degradation of the specimen of the component.

3. The method of claim 1, wherein monitoring the inferential variables involves applying a Sequential Probability Ratio Test (SPRT) to time series of the inferential variables to detect changes in the inferential variables.

4. The method of claim 3, wherein the inferential variables can include:
   a physical parameter for the component; and
   a first derivative of the physical parameter for the component.

5. The method of claim 4, wherein determining the time for the onset of degradation involves:
   detecting a change in the physical parameter for the component;
   determining whether the change indicates that the specimen of the component is at the onset of degradation; and
   if so, noting the time when the specimen of the component was determined to be at the onset of degradation.

6. The method of claim 4, wherein determining the time for the completion of degradation involves:
   detecting a change in the first derivative of the physical parameter;
   determining whether the change in the first derivative indicates that degradation of the component has completed; and
   if so, noting the time when the degradation of the component completed.

7. The method of claim 1, wherein prior to monitoring the inferential variables, the method further comprises applying test conditions to the specimen of the component.

8. The method of claim 7, further comprising:
   determining if the test conditions need to be modified; and
   if so,
      altering the test conditions; and
      continuing to monitor the inferential variables associated with specimens of the component.

9. A computer-readable storage medium storing instructions that when executed by a computer cause the computer to perform a method for characterizing degradation of a component in a system, wherein the method comprises:
- monitoring inferential variables associated with a specimen of the component;
- determining a time for an onset of degradation for the specimen;
- determining a time for a completion of degradation for the specimen;
- computing a time interval between the onset of degradation and the completion of degradation for the specimen; and
- using the time interval to look up an entry in a defect library to obtain information which characterizes the degradation of the specimen of the component.

10. The computer-readable storage medium of claim 9, wherein the method further comprises:
- determining the sign of the degradation; and
- using the time interval and the sign of the degradation to look up an entry in the defect library to obtain information which characterizes the degradation of the specimen of the component.

11. The computer-readable storage medium of claim 9, wherein monitoring the inferential variables involves applying a Sequential Probability Ratio Test (SPRT) to time series of the inferential variables to detect changes in the inferential variables.

12. The computer-readable storage medium of claim 11, wherein the inferential variables can include:
- a physical parameter for the component; and
- a first derivative of the physical parameter for the component.

13. The computer-readable storage medium of claim 12, wherein determining the time for the onset of degradation involves:
- detecting a change in the physical parameter for the component;
- determining whether the change indicates that the specimen of the component is at the onset of degradation; and
- if so, noting the time when the specimen of the component was determined to be at the onset of degradation.

14. The computer-readable storage medium of claim 12, wherein determining the time for the completion of degradation involves:
- detecting a change in the first derivative of the physical parameter;
- determining whether the change in the first derivative indicates that degradation of the component has completed; and
- if so, noting the time when the degradation of the component completed.

15. The computer-readable storage medium of claim 9, wherein prior to monitoring the inferential variables, the method further comprises applying test conditions to the specimen of the component.

16. The computer-readable storage medium of claim 15, wherein the method further comprises:
- determining if the test conditions need to be modified; and
- if so,
  - altering the test conditions; and
  - continuing to monitor the inferential variables associated with specimens of the component.

17. An apparatus that characterizes degradation of a component in a system, comprising:
- a monitoring mechanism configured to monitor inferential variables associated with a specimen of the component;
- a degradation-detection mechanism configured to:
  - determine a time for an onset of degradation for the specimen;
  - determine a time for a completion of degradation for the specimen; and to
  - compute a time interval between the onset of degradation and the completion of degradation for the specimen; and
- a defect-characterization mechanism configured to use the time interval to look up an entry in a defect library to obtain information which characterizes the degradation of the specimen of the component.

18. The apparatus of claim 17,
- wherein the degradation-detection mechanism is configured to determine the sign of the degradation; and
- wherein the defect-characterization mechanism is configured to use the time interval and the sign of the degradation to look up an entry in the defect library to obtain information which characterizes the degradation of the specimen of the component.

19. The apparatus of claim 17, wherein while monitoring the inferential variables, the degradation-detection mechanism is configured to apply a Sequential Probability Ratio Test (SPRT) to time series of the inferential variables to detect changes in the inferential variables.

20. The apparatus of claim 19, wherein the inferential variables can include:
- a physical parameter for the component; and
- a first derivative of the physical parameter for the component.

* * * * *